United States Patent [19]

Pinheiro

[11] Patent Number: 4,517,641
[45] Date of Patent: May 14, 1985

[54] LOOKAHEAD I/O DEVICE CONTROL SUBSYSTEM

[75] Inventor: Edwin J. Pinheiro, Rochester, Minn.

[73] Assignee: International Business Machines Corporation, Armonk, N.Y.

[21] Appl. No.: 373,366

[22] Filed: Apr. 30, 1982

[51] Int. Cl.³ .................................. G06F 3/04
[52] U.S. Cl. ............................................. 364/200
[58] Field of Search ................... 364/200, 300, 900

[56] References Cited

U.S. PATENT DOCUMENTS

| | | | |
|---|---|---|---|
| 4,126,895 | 11/1978 | Weemaes et al. | 364/200 |
| 4,200,928 | 4/1980 | Allan | 364/200 |
| 4,262,331 | 4/1981 | Freeland et al. | 364/200 |
| 4,392,196 | 7/1983 | Glenn et al. | 364/200 |

OTHER PUBLICATIONS

Overlapping Data Streaming and Concurrent Read/Write References Within a Storage Subsystem by C. Kinberg, et al., IBM Technical Disclosure Bulletin, vol. 24, No. 4, Sep. 1981, pp. 1947,1948.

Primary Examiner—Raulfe B. Zache
Assistant Examiner—David L. Clark
Attorney, Agent, or Firm—Bradley A. Forrest; Donald F. Voss

[57] ABSTRACT

An I/O device control subsystem for controlling issuance of commands to one I/O device while it is doing I/O device to I/O device data transfers with another I/O device. The I/O device control subsystem has a timer for indicating current time. The time required to write the transferred data, known at the time the data transfer command is issued, is added to the current time. Then, when a command is issued to the first I/O device while the other I/O device is writing the transferred data, the time required for executing that command is determined as well as the time remaining for completion of the write operation and if the time required for execution of the new command is less than the remaining time, the new command is allowed to be executed.

9 Claims, 9 Drawing Figures

LOOKAHEAD I/O DEVICE CONTROL SUBSYSTEM

TECHNICAL FIELD

This invention relates to an I/O device control subsystem and more particularly to such a subsystem for controlling an I/O device during I/O device to I/O device data transfers.

The invention finds particular utility in a computer system which includes a disk storage drive as one I/O device and a tape drive as another I/O device.

BACKGROUND ART

Many computer systems include both disk storage drives and tape drives. Commonly the disk storage drive temporarily stores data and programs which are periodically retrieved and restored while the central processing unit (CPU) is executing programs. Tape drives are more commonly used to store data and programs on a longer term basis than the disk storage. It is also quite common to transfer data from a disk storage drive to a tape drive and vice versa. The two I/O devices, however, generally have different operational characteristics. A disk storage drive is a random access device where data is recorded on concentric tracks having a particular format, normally divided into sectors. A read/write transducer is selectively positioned to the track on which data is to be read or written. A particular sector of the track is then located by the transducer as the disk rotates. The access time is relatively fast compared to access time of a tape drive which reads and writes data as tape moves from a supply source to a tape takeup, usually in the form of reels. Tape drives, however, can operate in a start/stop mode or in a streaming mode. When operating in the start/stop mode, the tape drive must be able to stop the tape in the interblock gap as data is read or written in blocks. For a low cost, medium performance tape drive, because of the high inertia of the reels, the tape must be driven at less than normal speed in order to stop the tape in the interblock gap. If the tape isn't stopped in the interblock gap then the tape has to be repositioned and this is very time consuming.

An alternative is to operate the tape drive in the streaming mode, but in the past the I/O device control subsystem had to be dedicated to the operation so as to assure that the next command for the drive be received within a predetermined time after completion of the previous command. Therefore, the disk storage drive had to be available when needed by the tape drive. The disk storage drives, however, may contain data or have space to write data in addition to data related to the tape operation. Consequently, if the disk storage drive is dedicated or locked to the tape operation, total system performance is degraded. The CPU, for example, could involve the disk storage drive during the interblock gap time for some other job, if there were assurance that the disk storage drive would complete this other command prior to the next command for the tape job. If it didn't then the time consuming operation of repositioning the tape would be required.

The present invention allows the tape to operate in the streaming mode without performance degradation. This is accomplished by operating the I/O control subsystem in a non dedicated mode.

DISCLOSURE OF THE INVENTION

The I/O control subsystem determines when an I/O command will be completed by each of two I/O devices performing an I/O device to I/O device data transfer. If one I/O device is a disk storage drive, the expected completion time for the disk read/write operation is determined. If the other I/O device is a tape drive, the time for reaching the next interblock gap is determined. If the access request is for a disk being used in the tape operation, the I/O control subsystem determines if the next available block of data for the tape operation can be read from or written to disk and the request completed prior to the tape interblock gap. If so, the request is honored, otherwise it is blocked.

DESCRIPTION OF THE INVENTION

Figure 1:
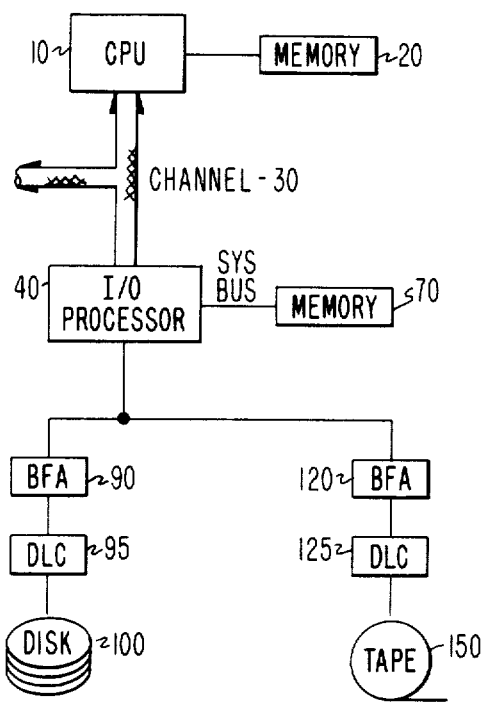
FIG. 1 is a schematic block diagram of a computer system incorporating the present invention.

With reference to the drawings, and particularly to FIG. 1, the invention is illustrated by way of example as being incorporated into a computer system including a central processing unit (CPU) 10 which is connected to main storage 20 and channel 30. Channel 30 connects to an I/O processor 40 which executes commands directed to it by CPU 10. The commands for I/O processor 40 are, in this example, for operation of disk drive 100 and tape unit 150. Disk drive 100 and tape unit 150 connect to the I/O processor 40 via device level controllers 95 and 125 and via buffer file adapters 90 and 120 respectively.

Figure 2:
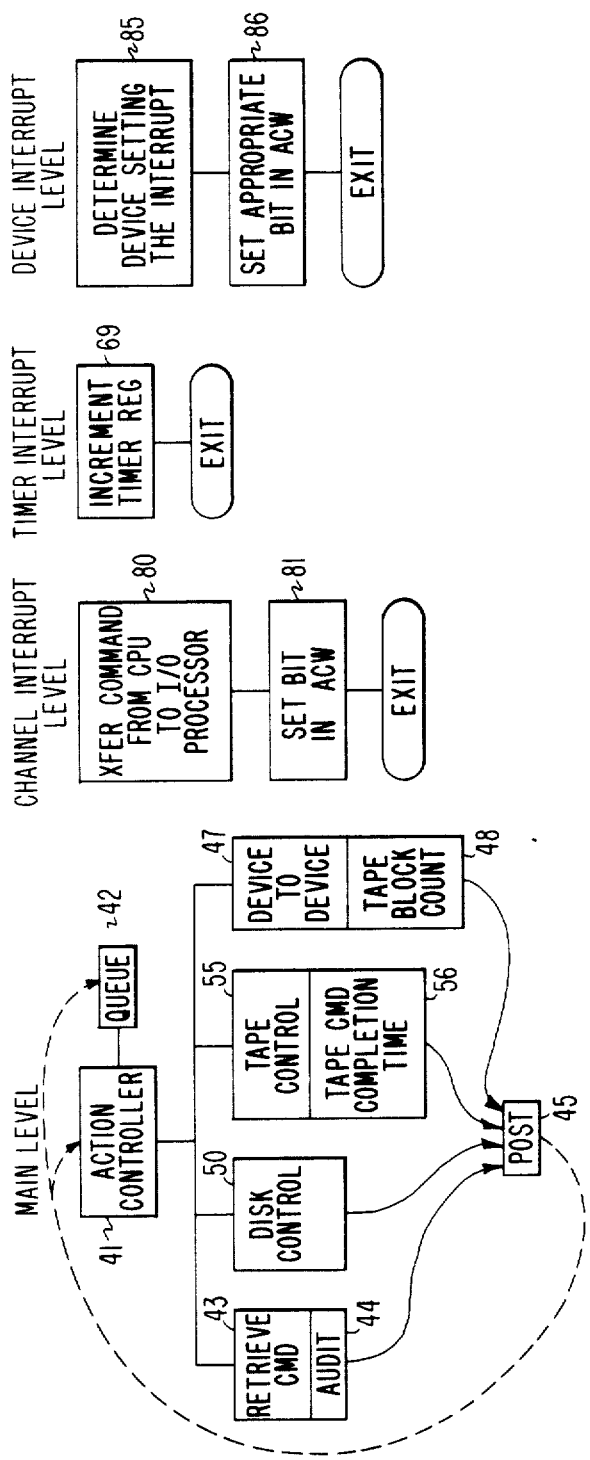
FIG. 2 is a schematic block diagram illustrating the main program level, the channel interrupt level, the timer interrupt level, and the device interrupt level in the I/O processor of FIG. 1.

When the CPU 10 wants I/O processor 40 to execute a command, it places the command and associated parameters into storage 20. CPU 10 then issues a simple command to I/O processor 40 whereby I/O processor 40 transfers the command from storage 20 to its own storage 70. The I/O processor 40 is preferably one having interrupt capability. The work-station controller described in the IBM System/34 Theory Diagrams Manual SY31-0458-5, copyrighted 1981 by the International Business Machines Corporation, includes an I/O processor which would be suitable for implementing the present invention. The I/O processor 40 upon receiving the simple command from CPU 10 generates an interrupt which, in this instance, would activate a microcode routine for retrieving the I/O command from storage 20 and transferring it to storage 70. The interrupt generated by I/O processor 40 is shown in FIG. 2 as on the channel interrupt level and it invokes the transfer command microcode routine represented by block 80. This microcode routine upon finishing the transfer of the command from storage 20 to storage 70, sets a bit in an Action Control Word (ACW) 71 in storage 70, FIG. 4. This is illustrated by block 81, FIG. 2. The retrieve command microcode routine is represented by block 43 in FIG. 2.

Figure 4:
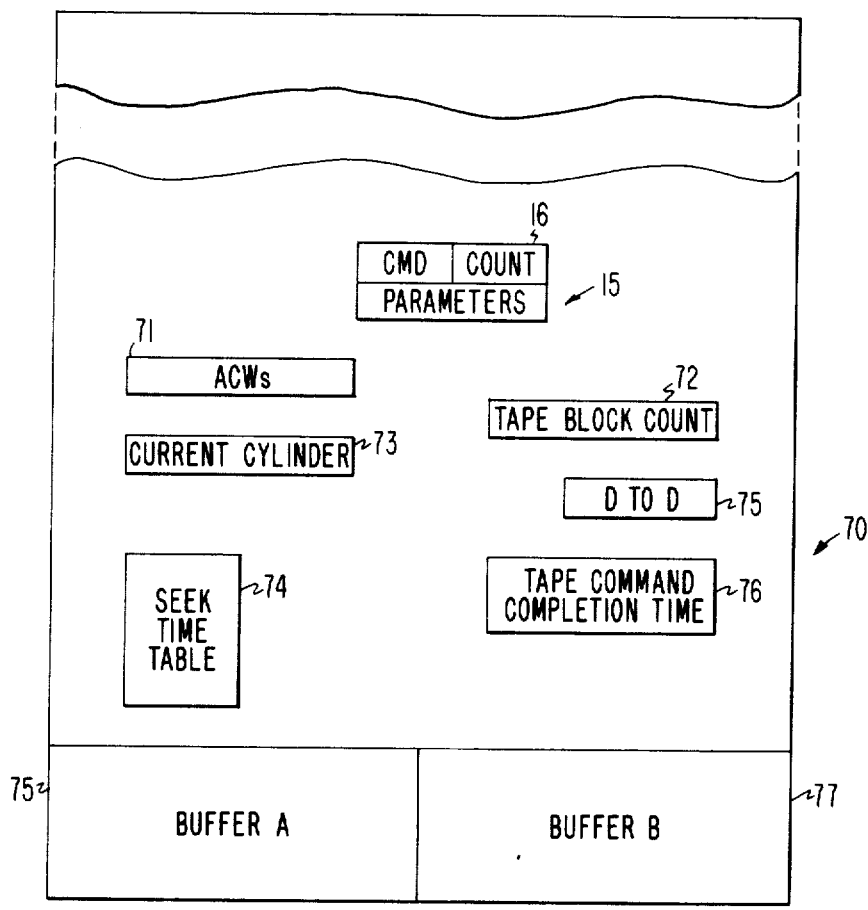
FIG. 4 is a schematic diagram illustrating areas of storage in the I/O processor of FIG. 1.
Figure 7A:
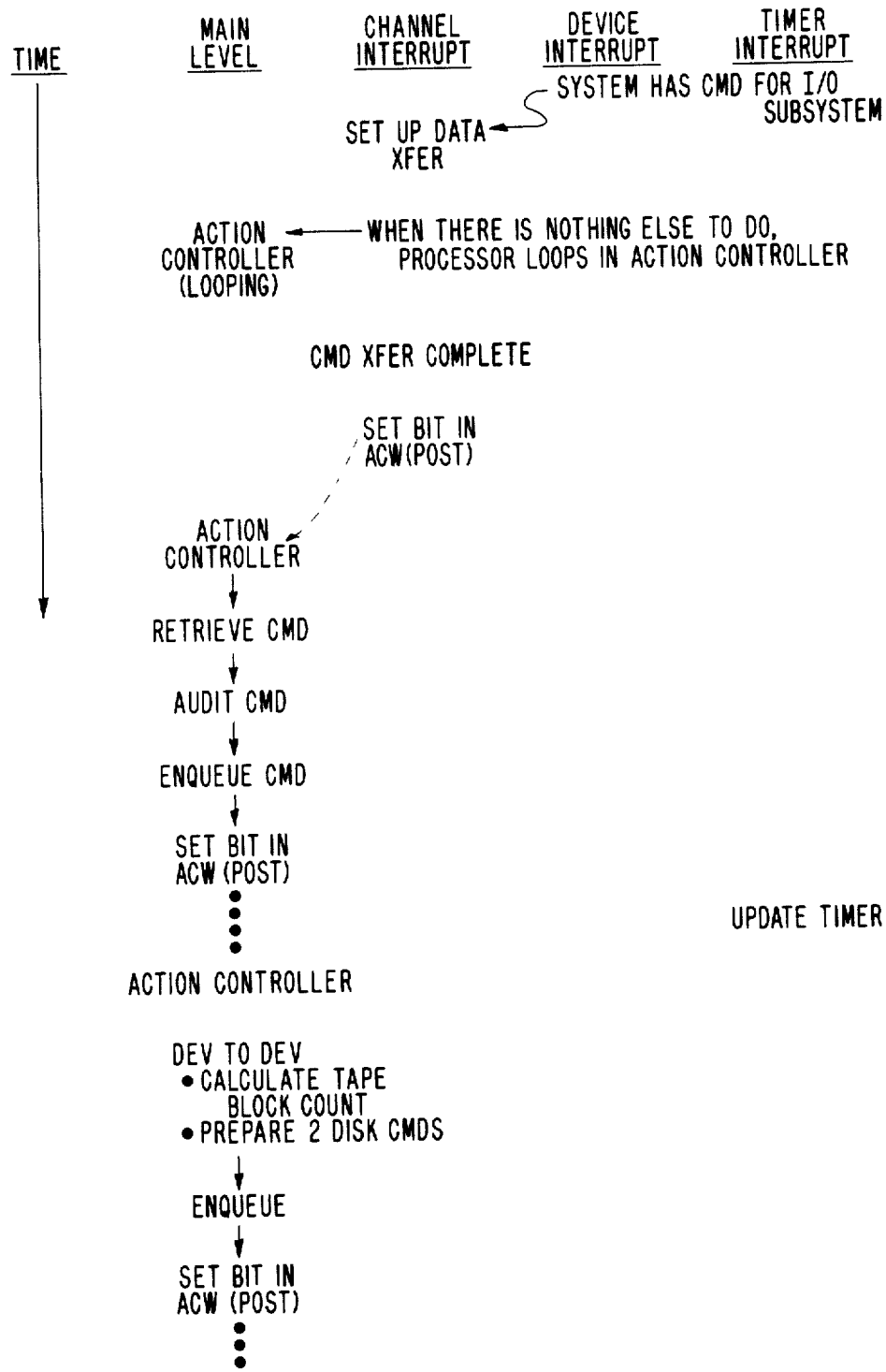

Action controller 41, FIG. 2, operates on the main processing level of I/O processor 40 and continually scans the action control words 71 schematically illustrated in storage 70, FIG. 4, checking to determine if a bit has been set therein. When an active bit is detected, the bit is set off and control is passed to the function associated with it. It should be noted that while I/O processor 40 was handling the channel interrupt, the action controller, operating on the main level, was looping as illustrated in FIG. 7a.

The I/O command 15 in storage 70 is assumed, in this instance, to be a command for transferring data between disk drive 100 and tape drive 150. The I/O command 15 is retrieved from storage 70 by the retrieve command microcode routine 43, FIG. 2, and placed in an internal register of I/O processor 40 and is then decoded by the audit portion 44 of the routine 43. The retrieve command microcode routine 43 was executed in response to action controller 41 detecting that the microcode routine 81 set a bit in an action control word 71.

The audit routine 44 detects the type of command and the action to be taken and enqueues that information in queue 42. The action controller 41 is in essence notified that audit 44 placed information on queue 42 by a post microcode routine 45 which sets a bit in an action control word 71 to have the action controller 41 invoke the device to device microcode routine 47.

The device-to-device microcode routine 47 essentially executes the command 15. The tape and disk data transfer rates have a great disparity. The disk data transfer rate is much higher than the tape data transfer rate. Because of this, two buffers 75 and 77 in storage 70, FIG. 4, are used for the data transfer operation. When data, as in this instance, is to be read from disk drive 100 and written onto tape by tape drive 150, the data is read from disk drive 100 and entered into buffer 75. The buffer size corresponds to the size of a tape block which in this example is 24 kilobytes, where a byte consists of eight bits. After buffer 75 is filled, tape drive 150 is commanded to read data from or empty buffer 75 and disk drive 100 is commanded to start filling buffer 77. The disk drive 100 cannot fill buffer 75 again until it has been emptied by tape drive 150. After tape drive 150 empties buffer 75, it will switch and start transferring data from buffer 77 and disk drive 100 will start to fill buffer 75 again. This action continues until the data transfer operation is complete. The amount of data to be transferred is indicated by a data transfer count in a field 16 of command 15, FIG. 4.

In executing command 15, device-to-device microcode routine 47 first retrieves the data transfer count from field 16 of command 15. A tape block count microcode routine 48 then determines how many tape blocks (24 kilobytes each) will be transferred using the arithmetic and logic unit (ALU) of the I/O processor 40. The tape block count is then stored in storage 70 as represented by block 72. The device-to-device microcode routine 47 then prepares two disk commands and enqueues them in queue 42. The action controller 41 is notified of the disk commands being enqueued by the post microcode routine 45 which sets a bit in an action control word 71. The action controller 41 scans the action control word 71 and calls the disk control microcode routine 50 which issues a device command to disk drive 100. The disk drive 100 would be set up by the device command to start a read operation and the data read would be entered into buffer 75. Once the disk operation is set up, the disk control microcode routine 50 has nothing else to do until the disk operation completes, so it returns control to the action controller microcode routine 41. When disk drive 100 completes the read operation, it generates a device interrupt which causes a bit to be set into one of the action control words 71 indicating the disk command is complete. Microcode routine 85, FIG. 2, determines which device set the interrupt and microcode routine 86 sets the appropriate bit in an action control word 71.

The action controller microcode routine 41 operating on the main program level detects the bit in the action control word 71 and again calls the disk control microcode routine 50. When disk control microcode routine 50 verifies that the command has completed successfully, it scans queue 42 to determine if another command for disk is pending. If there is, as in this case, it has post 45 set the disk bit in the action control word 71 so that the disk control microcode routine 50 will be called again by action controller 41. Post microcode routine 45 also notices that the command just completed was issued by device to device microcode routine 47 and thus sets a bit in the action control word 71 so that the action controller microcode routine 41 will pass control to device to device microcode routine 47. After the disk control microcode routine 50 issues the second device command to disk drive 100, it doesn't have anything else to do and the action controller 41 takes over and calls the device-to-device microcode routine 47 which prepares a tape command and enqueues it on queue 42. The post microcode routine then sets a bit in an action control word 71 and the action controller 41 responds by calling the tape control microroutine 55. The tape control microcode routine 55 then uses a tape command completion time microcode routine 56 to calculate and store the expected completion time of the tape command.

Figure 3:
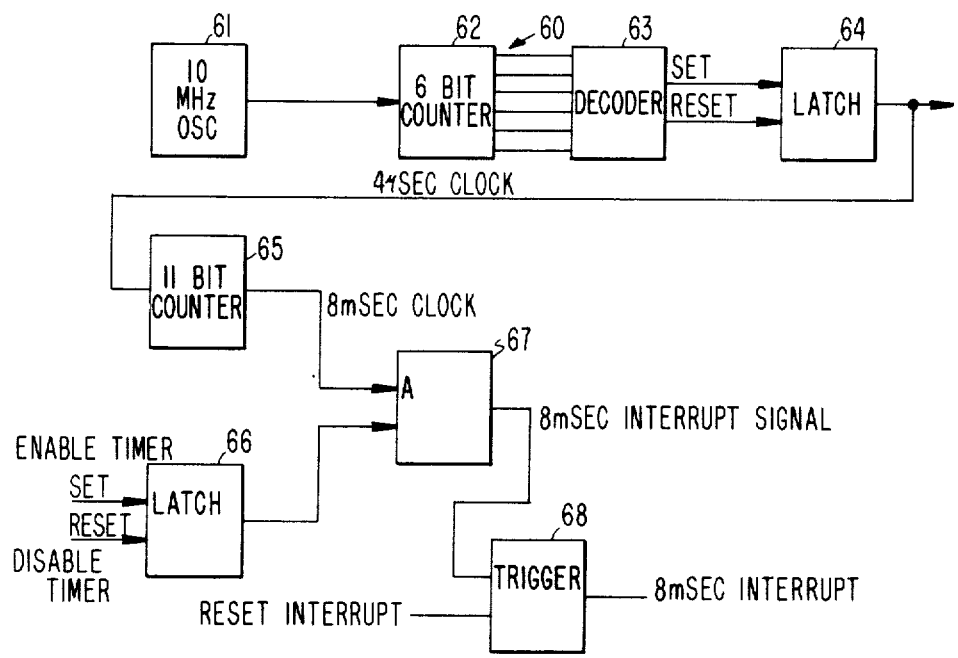
FIG. 3 is a schematic logic diagram of the timer built into the I/O processor of FIG. 1.

The expected completion time is determined by reading the current absolute time and adding to it a constant which corresponds to the time required to read or write one tape block. The derived completion time is then stored as tape command completion time in storage 70 as illustrated by block 76. The current absolute time is obtained from a timer 60 built into I/O processor 40. The timer 60, FIG. 3, includes a 6-bit counter 62 which receives pulses from system oscillator 61. The outputs of counter 62 are applied to decoder 63 and decoder 63 sets and resets latch 64 to produce a 4 microsecond clock signal. The 4 microsecond clock signal from latch 64 is applied to 11 bit counter 65 having its output connected to AND circuit 67. AND circuit 67 is conditioned by the output of latch 66 which is set and reset by enable and disable timer signals respectively. The output of counter 65 is at an up level once every 8 milliseconds and if latch 66 is set, AND circuit 67 passes an 8 millisecond interrupt signal which is applied to trigger 68. The output of trigger 68 provides a 8 millisecond interrupt signal to the interrupt mechanism of the I/O processor 40. By this arrangement, an interrupt is generated to I/O processor 40 every 8 milliseconds. An increment timer microcode routine 69, FIG. 2, is invoked on this interrupt level and it increments the contents of a general purpose register in the I/O processor 40 designated as the timer. An interval of time can be measured by comparing the value in this register at the beginning of the interval with the value in the register at the end of the interval. The numeric difference then corresponds to the number of 8 millisecond periods elapsed during the interval.

The tape control routine 55 then issues a device command to tape drive 150. The tape drive 150, which has been idle, is brought into operation and starts to empty buffer 75. Because of the disparity in data transfer rates between disk drive 100 and tape drive 150 as previously noted, disk drive 100 completes the filling of buffer 77 before tape drive 150 has emptied buffer 75. When disk drive 100 has completed the second device command by filling buffer 77, it generates a device interrupt which is serviced by the device interrupt level. When this interrupt occurs, microcode routine 85 determines which device set the interrupt and then passes control to microcode routine 86 for setting an appropriate bit in an action control word 71. With buffer 75 full, disk drive 100 goes into an idle state waiting for its next command. The next command could come from disk control 50 or it could come from the central processing unit 10. Disk drive 100, however, must be available to fill buffer 75 again upon tape drive 150 emptying that buffer. The present invention, in order to improve performance of the computer system without degrading performance of the data transfer operation from disk drive 100 to tape drive 150, will allow disk drive 100 to execute a command if it can complete the execution of the command prior to the tape command completion time stored in storage 70. The disk control microcode routine 50, shown in detail in FIG. 5, determines if there is enough time for the disk drive 100 to execute the new command prior to the current tape command being completed.

In this example, the current absolute time is known within 8 milliseconds. The time to write one tape block is also known as well as the expected completion time of the tape command. Thus the time remaining until the tape command completes can be determined by subtracting the current absolute time at the time the new disk command is received from the tape command completion time stored in storage 70 as represented by block 76. The time for executing the new disk command can be determined or predicted because the time to execute a disk command has the following time components:

Time 1: time to seek to new track
Time 2: rotational latency time
Time 3: read(or write) time
Time 4: time to seek back to original track.

Time 1 and time 4 are equal. These times are determined exclusively by the absolute distance (in tracks) covered. These times are published in the device specification and therefore are known. Additionally, I/O processor 40 maintains in storage 70 a block of information 73 for each disk. Included in this block of information is the current cylinder, i.e. the cylinder and track where the head is currently located. The track which is to be accessed or the desired track information is part of the disk command. A seek time table 74 contains the seek time for each possible time distance. Thus, to determine times 1 and 4, I/O processor 40 compares the current track location with the desired track using the difference as an index to access seek time table 74. The value of time 1 and time 4 is the value read out from the seek time table 74 as a result of the access.

Rotational position sensing (RPS) is used to obtain the value of time 2. Rotational position sensing is a technique incorporated into disk storage drive whereby the disk drive presenting the first available sector containing the requested data is coupled for data transfer. Hence, if the current track position with respect to the head is sensed, it is possible to determine its position at a specified time in the future because the disk rotates at a fixed speed. Also, the position of the data to be sensed or accessed is known because the sector or RPS information is included in the command. After the RPS takes place, the location where the head will be on the track with respect to the desired data when the seek to that track is complete, can be determined. The distance to the data is then converted to time and this is time 2. Time 3 is determined by dividing the total number of sectors to be read or written by the sector time which is a known time. Thus when the new disk command is received, I/O processor 40 determines the above time, i.e., time 1-time 4 inclusive and adds these times to the current absolute time. The result is then compared to the tape command completion time 76 which is retrieved from storage 70. If the tape command completion time 76 is greater than the time for executing the disk command, then the disk command can be executed without interferring with tape operation and the disk drive 100 will be available to fill buffer 75 after tape drive 150 empties it.

Figure 5:
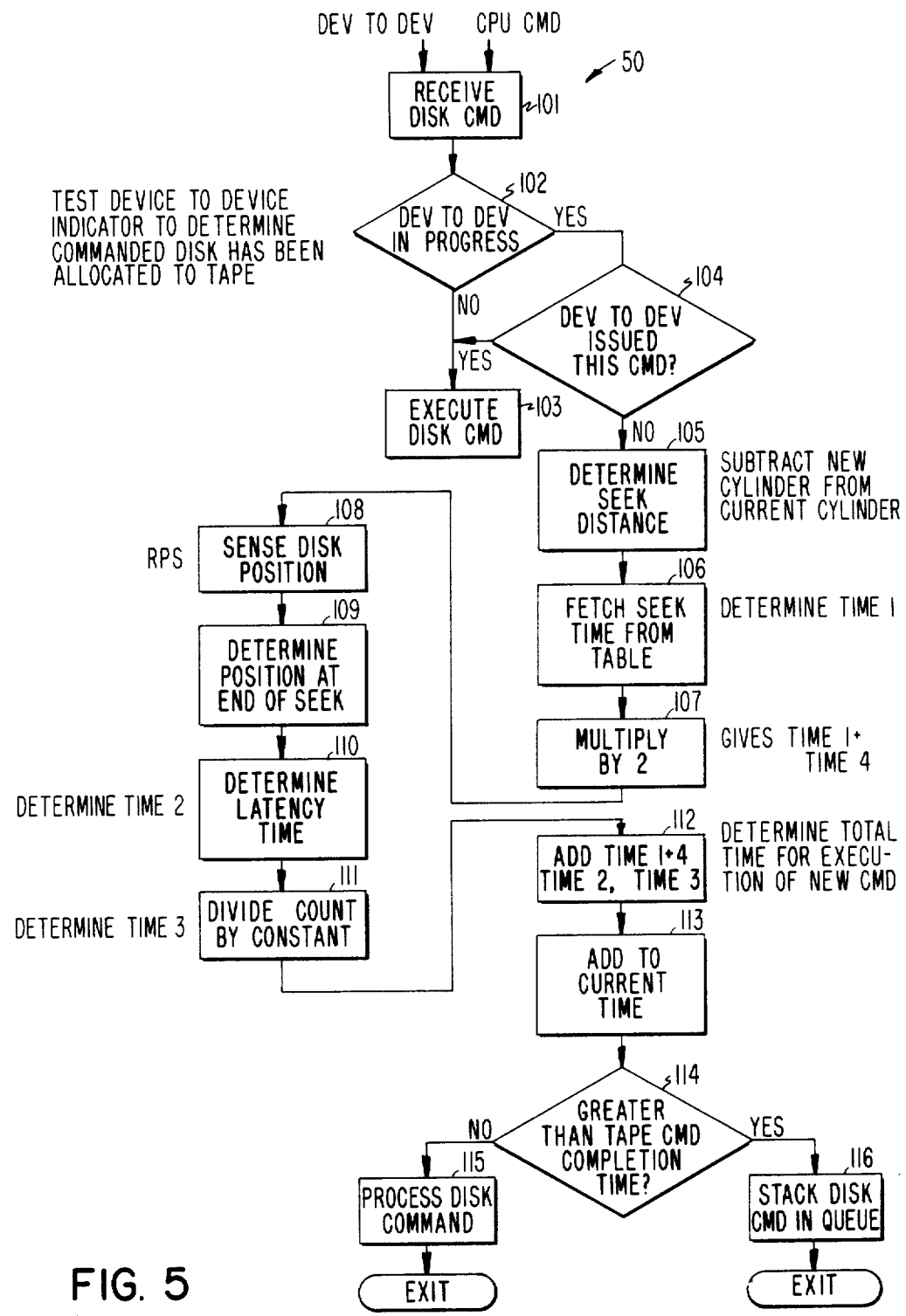
FIG. 5 is a flow diagram of the disk control microcode routine shown in block form in FIG. 2.

The disk control routine 50, includes the determination as to whether or not a disk command can be executed according to the present invention, and is shown in detail in FIG. 5. The block 101 receives a disk command from either the CPU 10 or from the device-to-device microcode routine 47 as previously mentioned. Decision block 102 tests the device-to-device indicator 75 which is set in storage 70 when device to device routine 47 issues a command to determine if a device-to-device command is in progress. If not, the disk command is executed as indicated by the block 103. If there is a device-to-device issued command in progress, then decision block 104 tests to determine if the device-to-device microcode routine 47 issued the present command. If it did issue the present command, then the command is executed as indicated by block 103. If it did not issue the present command, then because the disk has been allocated to tape it is necessary to determine if execution of the present command can be completed prior to the tape command completion time.

This determination is made by first determining the seek distance as represented by block 105 whereby the new cylinder is substracted from the current cylinder. The current cylinder is stored in storage 70 as represented by block 73. The new cylinder is contained in the command. The next step is to determine the time to seek to a new track and this is represented by block 106 where a seek time is fetched from table 74. This time is then multiplied by two as indicated by block 107 to provide time 1 and time 4 as previously explained. The RPS determination is then made as indicated by blocks 108 and 109. The disk position is sensed as indicated by block 108 and the position at the end of a seek is determined as indicated by block 109. The latentcy time is then determined as indicated by block 110 to provide time 2. The read time, or write time, is then determined by dividing the total number of sectors to be read or written by the sector time which, in this instance, is a constant as indicated by block 111. The total time for execution of the new command is then determined by summing the times 1, 2, 3 and 4 as indicated by block 112. This total time for execution of the new command is then added to the current time which, as previously explained, is contained in a register in the I/O processor 40. This step is represented by a block 113. A test is then made as indicated by block 114 for comparing the results of block 113 with the tape command completion time 76 retrieved from storage 70. If the value obtained in step 113 is less than the tape command completion time, the disk command is processed as indicated by block 115 whereas if it is not, then the disk command is stacked in queue 42 for execution at a later time.

Figure 6:
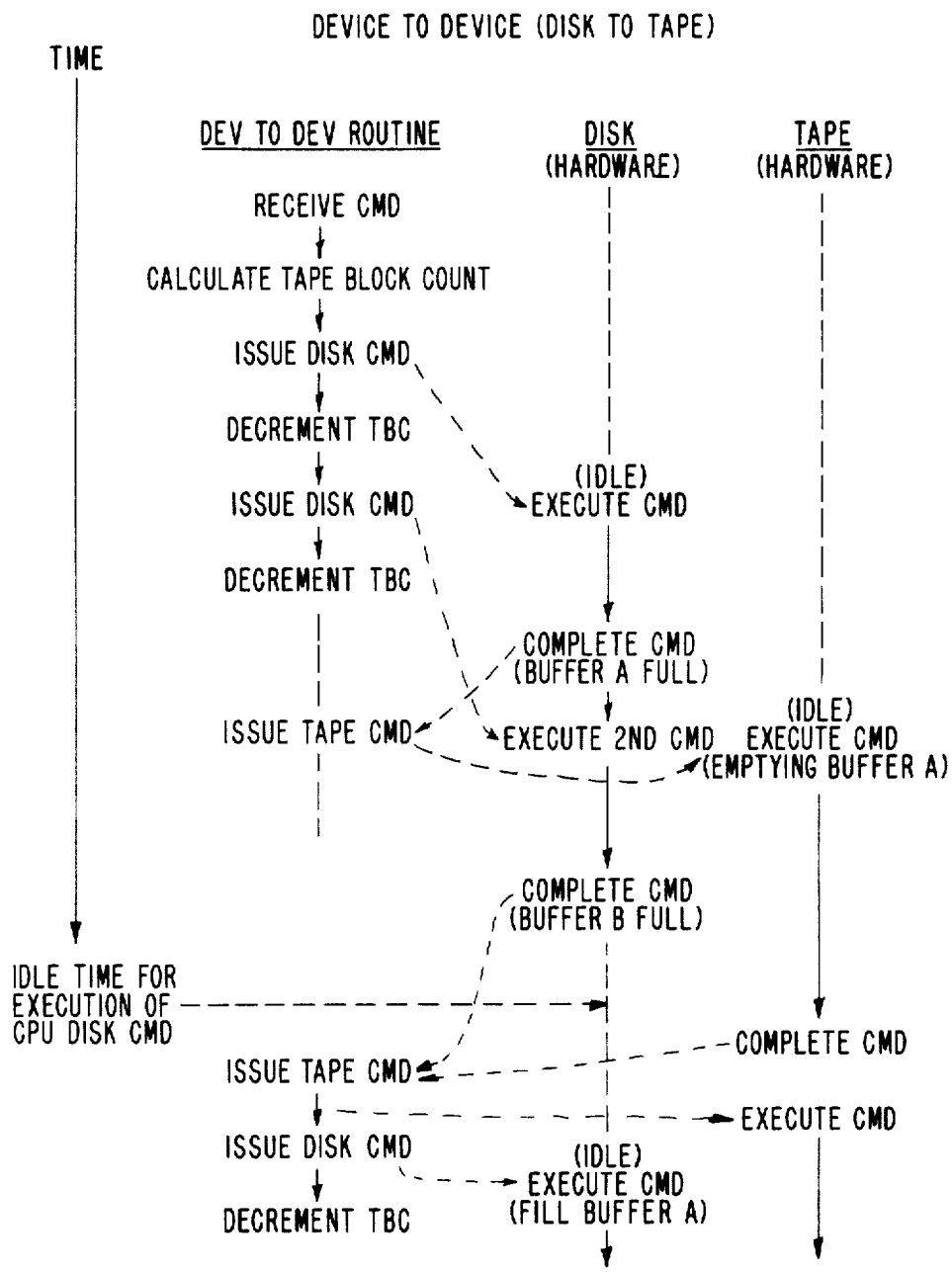
FIG. 6 is a flow diagram of the device to device microcode routine shown in block form in FIG. 2; and, FIGS. 7a, 7b and 7c taken together are an action diagram showing the sequence of events taking place on each level during operation of the present invention.

The operation of disk drive 100 and tape drive 150 under control of the device-to-device microcode routine 47 with respect to time is illustrated in FIG. 6. In this instance, when the device-to-device mircocode routine 47 receives a command, the disk drive 100 and the tape drive 150 are idle. The device-to-device microcode routine 47 then through the facility of the tape block count microcode routine 48 calculates the tape block count 72 and stores it in storage 70. The device-to-device microcode routine 47 then issues a command to disk drive 100 and decrements the tape block count 72. Disk drive 100 executes the command and device-to-device microcode routine 47 issues another command for disk drive 100. When disk drive 100 completes the first command, buffer 75 will be full, if the operation is a read operation or it will be empty, if the operation is a write operation. Disk drive 100 then executes the second command and device-to-device microcode routine 47 decrements the tape block count 72 and issues a tape command. Tape drive 150 which has been idle until this time, executes a tape command emptying buffer 75. If the command were a tape to disk data transfer, then the above sequence of operations would be reversed.

When disk drive 100 completes the second command, buffer 77 will be full. Disk drive 100 then idles and it is this idle time which is measured to determine if a command for the disk drive 100 from CPU 10 can be executed prior to the tape command completion time. The issuance of a disk command from CPU 10 is not illustrated in FIG. 6 but the idle time is shown. After disk drive 100 has completed the second command filling or emptying buffer 77, the device-to-device microcode routine 47 issues another tape command upon being notified that the first tape command is complete. Tape drive 150 would then execute this second command and another disk command would be issued by device-to-device microcode routine 47 whereby disk drive 100 would again execute the command to fill or empty buffer 75 while tape drive 150 was emptying or filling buffer 77. The tape block count 72 would again be decremented and when the tape block count is zero, the operation is complete. Otherwise another tape command is prepared and issued. The operation then continues in the manner described until the tape block count 72 is decremented to zero.

Figure 7B:
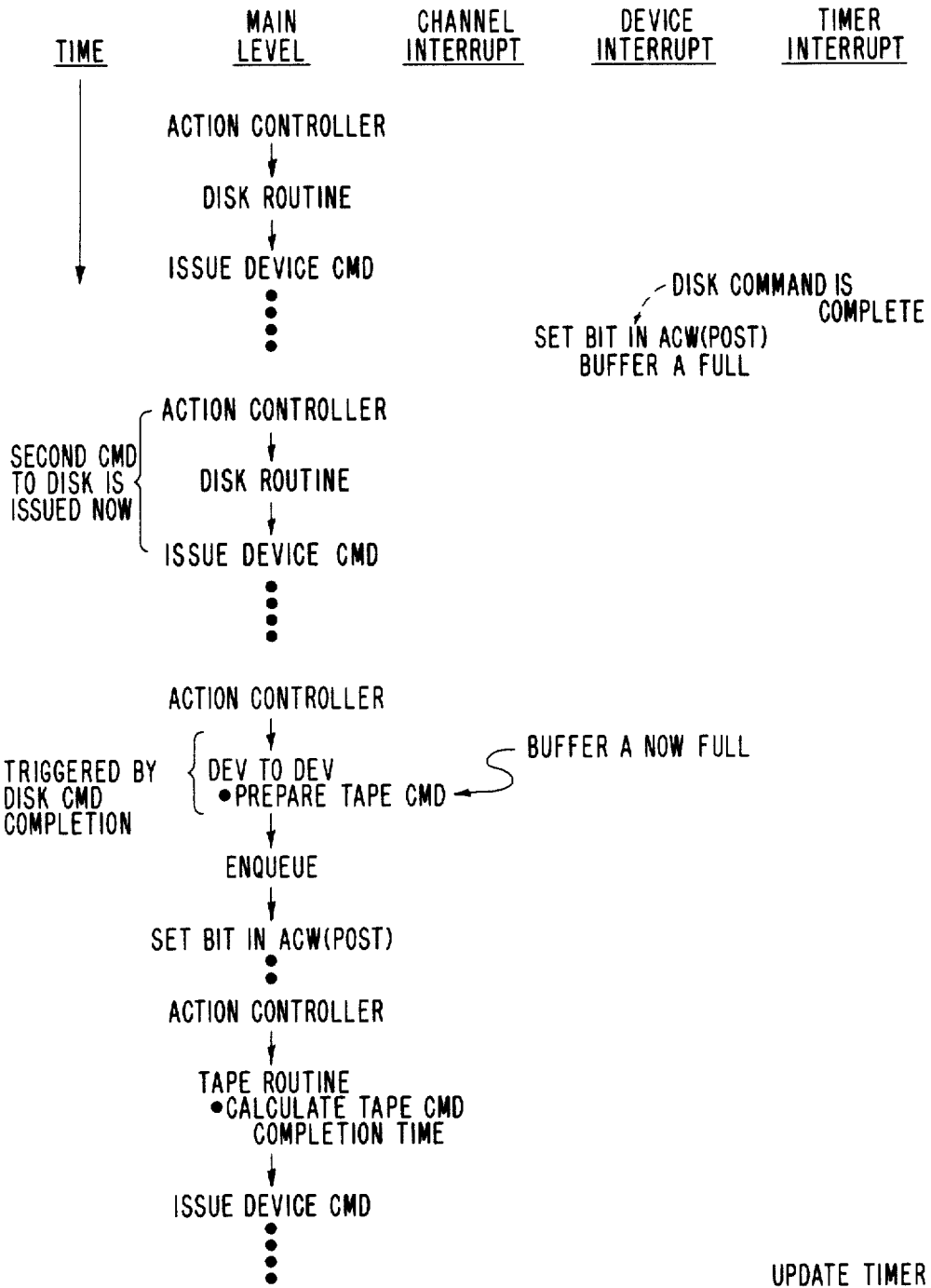
Figure 7C:
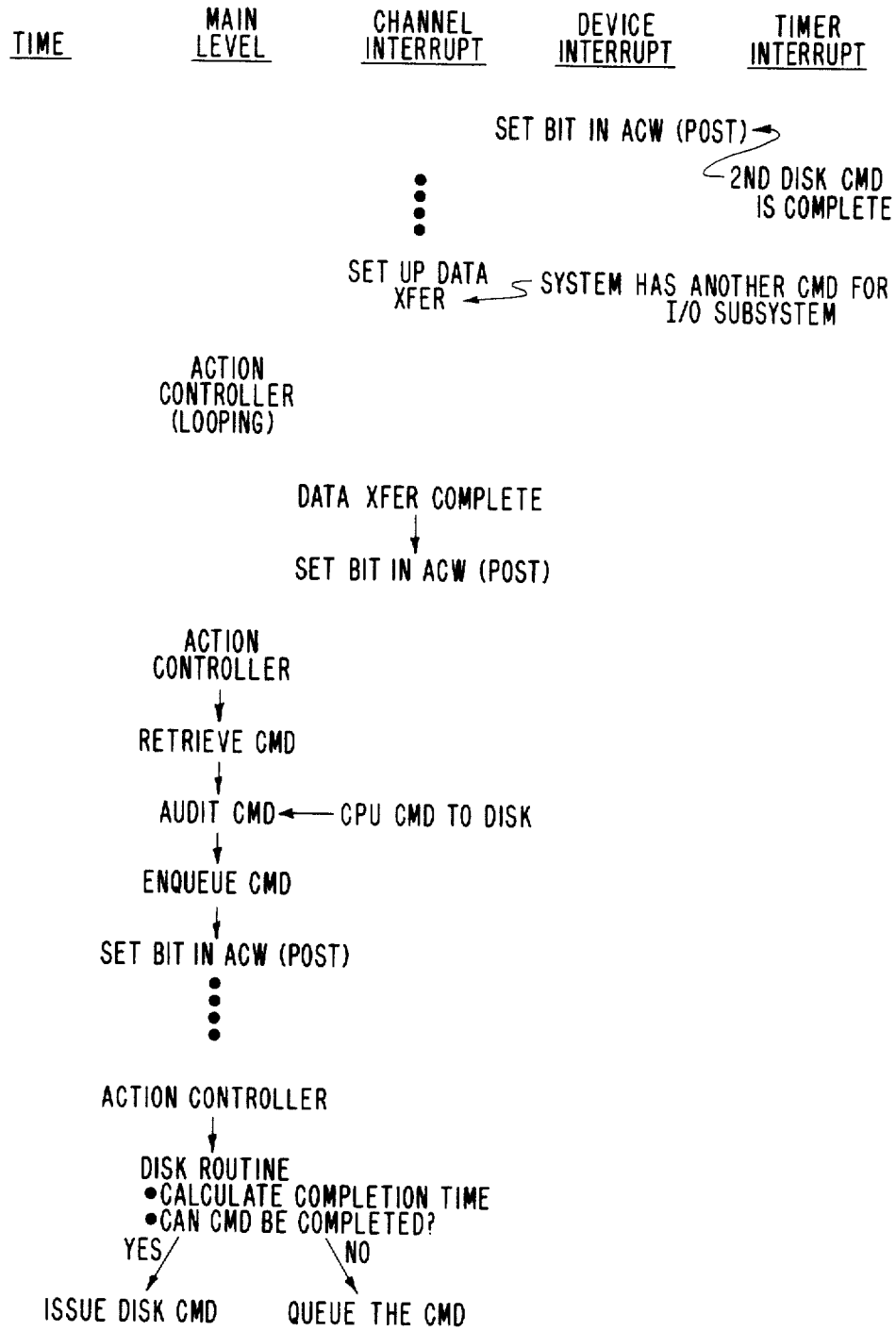

The operation of the invention is also represented in FIGS. 7a, 7b and 7c which show the operation of the main program level, the channel interrupt level, the device interrupt level and the timer interrupt level with respect to time. The entire operation is initiated with a data transfer command from the CPU 10 where the command is transferred by I/O processor 40 into storage 70 while operating on the channel interrupt level. Until there is something to be done, the action controller 41 loops on the main level. When the command transfer is complete, a bit is set in an action control word 71 and the channel interrupt level is exited. The action controller 41 scans the action control words 71 and determines that there is a command pending whereby it invokes the retrieve command routine 43 which then retrieves the command from storage 70 and places it in queue 42 and through the post routine 45 sets a bit in the action control word. A timer interrupt then occurs where the current absolute time is updated. This interrupt is then exited and the operation returns to the main program level.

The action controller 41 again scans the action control word 71 and detects a bit indicating that the device-to-device microcode routine 47 should be invoked. This microcode routine then calculates the tape block count and prepares two disk commands in this instance. These disk commands are placed on queue 42 and post routine 45 sets a bit in an action control word 71.

Action controller 41 again scans the action control words 71 and this time invokes the disk control microcode routine 50. The disk control microcode routine 50 issues a device command to disk drive 100. The disk drive 100 executes the command and upon completing the execution thereof, a device interrupt occurs and a bit is set in an action control word 71. The device interrupt is exited and the operation returns to the main program level where the action controller 41 again invokes the disk control microcode routine 50 which issues a second command to disk drive 100. Since the disk control routine 50 has no further action to take at this time, the action controller invokes the device-to-device microcode routine 47 which prepares a tape command and places that command on queue 42. A bit is set in an action control word 71 by the post routine 45 and the action controller 41 upon detecting the setting of this bit in the action control word 71 invokes the tape control routine 55 and the microcode routine 56 calculates the tape command completion time. Tape control routine 55 then issues a device command to tape drive 150. A timer interrupt occurs to update the current absolute time in a register of the I/O processor 40.

The timer interrupt level is then exited and the operation returns to the main program level where action controller 41 is looping. A device interrupt then takes place because disk drive 100 has completed the execution of the second command. During the device interrupt, a bit is set in an action control word 71. Additionally, in this example, CPU 10 issues a command for the I/O subsystem. This causes a channel interrupt and the command is transferred to storage 70 and a bit is set in an action control word 71. Action controller 41 invokes the retrieve command routine 43 and the command is placed in queue 42. The post routine 45 then sets a bit in an action control word 71. This causes action controller 41 to invoke the disk control routine 50. The disk control routine then goes through the steps as previously described in connection with FIG. 5 to determine whether or not the disk command can be sent to the disk drive 100.

From the foregoing, it is seen that the present invention allows a tape drive to operate in a streaming mode without performance degradation by operating the I/O control subsystem in a nondedicated mode. The I/O control subsystem, however, will allow a disk command not related to an I/O device to I/O device data transfer to be executed only if its execution can be completed prior to the time that the service of the disk storage drive is required for the I/O device to I/O device data transfer operation.

It should be noted that the invention can have other implementations. For example, an empirical method can be used for determining the time to complete a command which is not involved in the device-to-device data transfer. A constant can be used to represent an average seek time and another constant can be used for representing the average rotational latency time. These constants would be chosen so that there would be no degradation of performance during the device-to-device data transfer operation. On the other hand, the constant would be chosen so as to improve the overall performance of the computer system.

It should also be noted that the present invention can be embodied in a computer system where the disk commands are queued. In such a system, if a disk command not related to the tape data transfer operation is inhibited because its execution time would extend beyond the tape command completion time, the queue would be searched for a disk command which could be executed before tape command completion time.

I claim:

1. An I/O device control subsystem for providing a command for execution by a first I/O device in an idle mode after providing a previous command for a data transfer by a second I/O device which is still busy with said data transfer, the data transfer rate of said first I/O device being greater than the data transfer rate of said second I/O device, the improvement comprising:
    means coupled to the first I/O device for determining the time required for execution of said command by said first I/O device;
    means coupled to the second I/O device for providing a time indication of the time at which said second I/O device will complete said data transfer;
    means for indicating current time;
    means coupled to the current time indicating means and the command execution time means for combining said command execution time with said current time to provide a command execution completion time; and
    means coupled to the command execution completion time means, the current time indicating means, the first I/O device, and the second I/O device data transfer completion time means for comparing said command execution completion time with said time indication of the time at which said second I/O device will complete said data transfer and enabling execution of the command by said first I/O device if said execution completion time is less than said time indication and if execution of the command does not interfere with the data transfer by the second I/O device.

2. The I/O device control subsystem of claim 1 wherein said means for indicating current time is a timer having sufficient accuracy relative to the command execution time such that execution of a command enabled by the comparing means will complete prior to completion of said data transfer by said second I/O device.

3. The I/O device control subsystem of claim 1 wherein said means for providing a time indication of the time at which said second I/O device will complete said data transfer provides such time indication within a time compatible with the accuracy of said means for indicating current time.

4. A I/O device controller providing commands to an I/O device including a settable timer for measuring actual elapsed time since said timer is set, means for estimating subsequent command execution times of the I/O device being controlled, means for comparing the estimates to the elapsed time, and means for issuing the subsequent commands to the I/O device at times based upon the comparison.

5. A method for controlling execution of multiple data transfer commands by an I/O device of a computer system for transferring data to and from the computer system and other devices wherein the I/O device is controlled by an I/O device control subsystem which executes steps, comprising:
    receiving a first command for transferring an amount of data;
    calculating the duration of a first time interval based on the amount of data to be transferred, at the end of which, further commands must be executed by the I/O device;
    enabling execution of the first command by the I/O device such that the first command is completely executed prior to the end of the first time interval;
    initiating a real-time timer after calculation of the first time interval to measure the time available until the end of said first interval;
    receiving a second command during said first interval;
    calculating the duration of the second time interval required for completion of execution of said second command by the I/O device, and;
    enabling the I/O device to execute the second command only if the first command is completely executed and said second time interval is less than the remaining time available until the end of said first interval.

6. The method of claim 5 further comprising receiving a third command during said first interval when the duration of execution of said second command is greater than the remaining time available until the end of said first interval;
    calculating the duration of a third time interval required for completion of the third command; and
    executing the third command only if said third time interval is less than the remaining time available until the end of said first interval.

7. In an I/O device controller for providing commands to a first I/O device which transfers multiple blocks of data to a second device which receives such blocks of data at a slower rate than the first I/O device provides them, the first I/O device also providing transfers of data to further devices, the improvement comprising:
    first means for determining a time interval between consecutive transfers of data to the second device as a function of the size of the block of data being received by the second device and the data receiving rate of the second device;
    second means for estimating command execution times of the I/O device being controlled as a function of the amount of data to be transferred and the data transfer rate of the first I/O device; and
    third means coupled to the first and second means for comparing the time interval to the command execution time to enable execution of a data transfer command by the first I/O device to transfer data to a further device, when such comparison indicates that the data transfer command will be completely executed before the end of the time interval and to inhibit execution of a data transfer command when such comparison indicates that the data transfer command will not be completely executed before the end of the time interval.

8. The controller of claim 7 wherein the first I/O device upon completion of a transfer of a block of data to the second device is in a condition conductive to transfer of further blocks of data to the second device, and wherein the command execution time is a further function of the time required to return the first I/O device to such condition following a transfer of data to the further device.

9. The controller of claim 7 wherein more than one transfer of data to further devices are enabled between transfers of blocks of data to the second device provided that such data transfers are completed before the end of the time interval.

* * * * *